Figure 1:
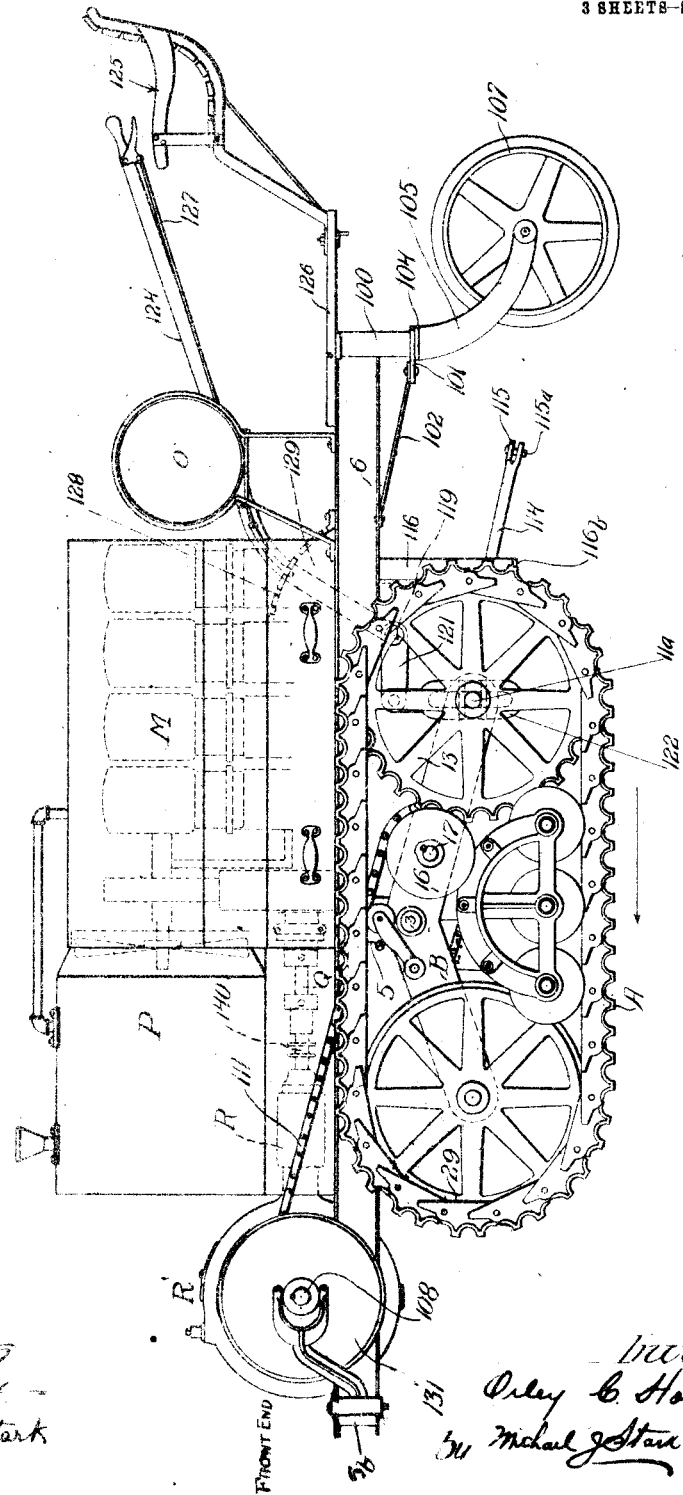

O. C. HOUGHTON.
TRACTION ENGINE.
APPLICATION FILED OCT. 31, 1913.

1,107,791.

Patented Aug. 18, 1914.
3 SHEETS—SHEET 1.

Witnesses
R. C. Barrett
Ada M. Stark

Inventor
Orley C. Houghton
By Michael J. Stark & Sons
Attys

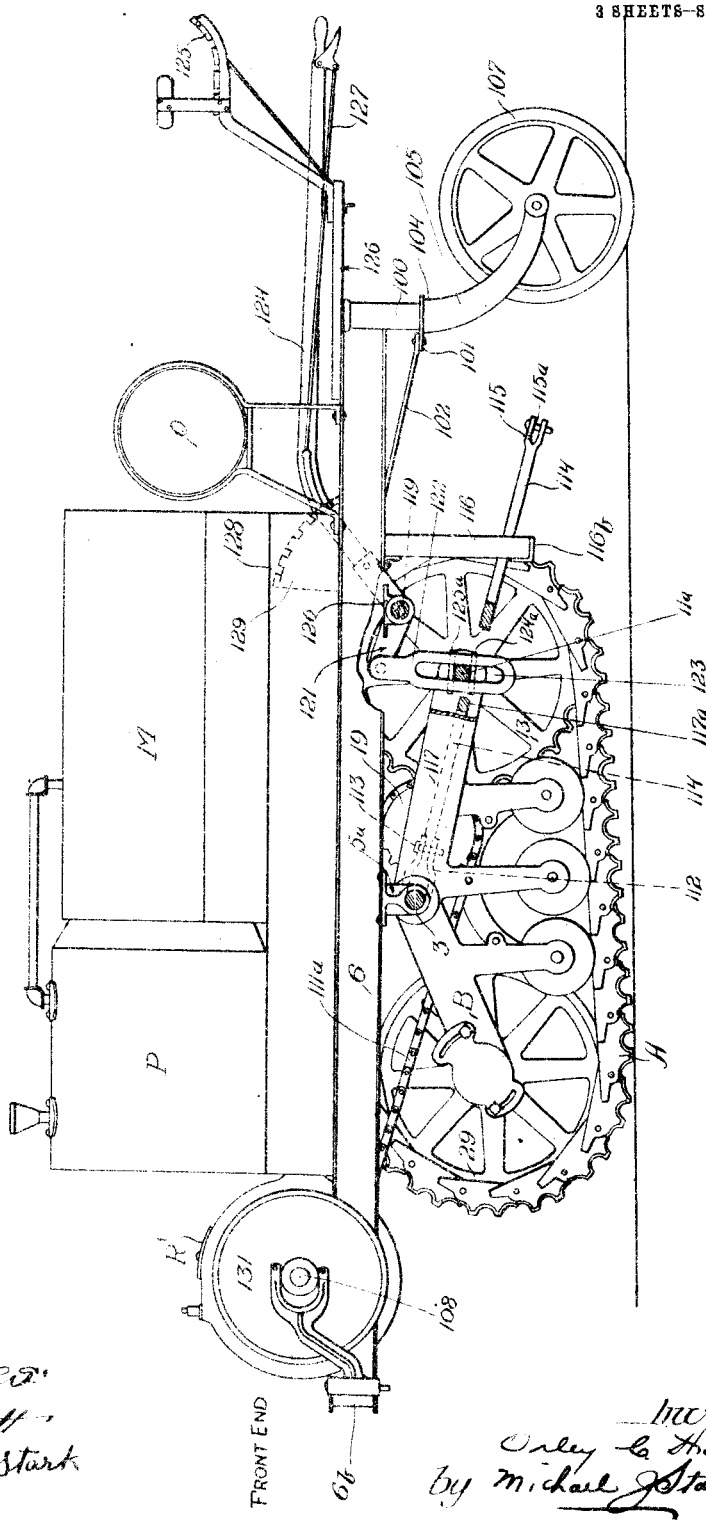

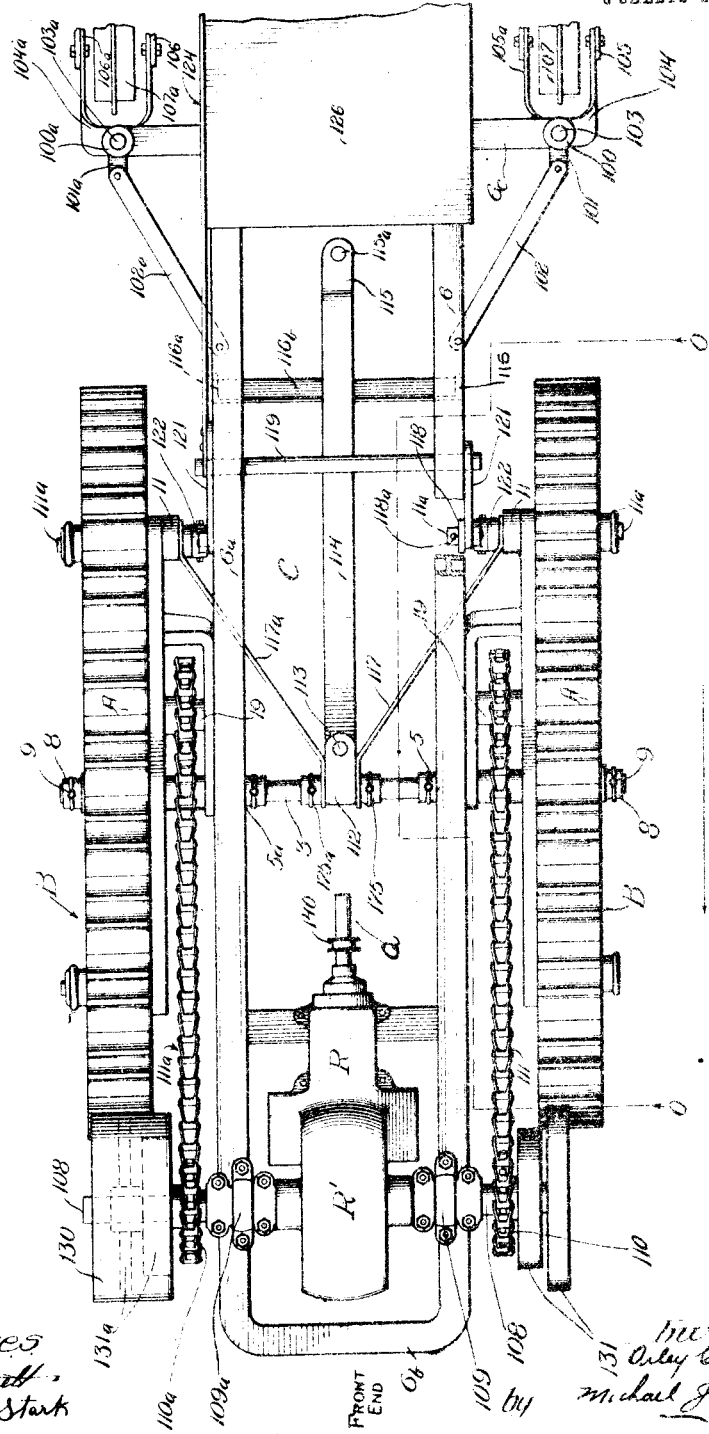

UNITED STATES PATENT OFFICE.

ORLEY C. HOUGHTON, OF CHICAGO, ILLINOIS, ASSIGNOR TO BULLOCK TRACTOR COMPANY, OF CHICAGO, ILLINOIS, A CORPORATION OF ILLINOIS.

TRACTION-ENGINE.

1,107,791.  Specification of Letters Patent.  Patented Aug. 18, 1914.

Application filed October 31, 1913. Serial No. 798,473.

*To all whom it may concern:*

Be it known that I, ORLEY C. HOUGHTON, a citizen of the United States, and a resident of the city of Chicago, in the county of Cook and State of Illinois, have invented a certain new and useful Improvement in Traction-Engines; and I do hereby declare that the following description of my said invention, taken in connection with the accompanying sheets of drawings, forms a full, clear, and specific specification, which will enable others skilled in the art to which it appertains to make and use the same.

My invention relates generally to improvements in traction engines, and it consists, essentially, in the novel and peculiar combination of parts and details of construction, as hereinafter first fully set forth and described and then pointed out in the claims.

In the drawings already referred to, which serve to illustrate my said invention more fully, Figure 1 is a side elevation of my improved traction engine. Fig. 2 is a similar elevation, partly in section in line O—O of Fig. 3, and Fig. 3 is a plan thereof with the power plant and other parts removed for sake of clearness of illustration.

Like parts are designated by corresponding characters and symbols of reference in all the figures of the drawings.

One great fault in traction engines of the endless track type is the tremendous power loss while negotiating turns. When swerving from a straight course, there is caused a skidding action of one or the other endless track chains, depending upon the direction of the swerving movement, and also a drag upon the ground of one of the chains. The power loss from this alone often reduces the effective tractive force of the engine from 25 to 30 per cent. Again the stresses and reversal of stresses produced are abnormal and result in a frequent breakage of parts at inconvenient times.

The essence of my invention, therefore, resides in means to prevent this skidding action and drag of the endless track chains while executing a turning movement and the elimination of the abnormal stresses created thereby. Thus, to better understand my invention, I now refer to the drawings in which—

C represents the main structural frame of a traction engine composed preferably of structural beams and comprising, essentially, longitudinal side sills 6 and $6^a$ and a front connecting beam $6^b$. Said frame may be bent up from a single beam as indicated in Fig. 3, or beam $6^b$ may be riveted to sills 6 and $6^a$ as may be desired. At the opposite or rear end of frame C there is securely fastened a cross beam $6^c$, the ends of which project a considerable distance beyond the side sills 6 and $6^a$. At the ends of the said beam are rigidly attached in a vertical plane, tubular trunnions 100 and $100^a$. At the lower ends of these trunnions are lips 101 and $101^a$ to which are riveted diagonal braces 102 and $102^a$, the opposite ends of which are similarly fastened to the under sides of sills 6 and $6^a$, respectively. The object of these braces is to impart additional stiffness to trunnions 100 and $100^a$ to better resist undue stresses and strains.

Freely fitting the interior of the trunnions 100 and $100^a$ and rotatable therein, are shanks 103 and $103^a$ of rearwardly bent forked frames 104 and $104^a$, between the legs 105 and $105^a$, and 106 and $106^a$ of which are journaled trailing ground wheels 107 and $107^a$. Any preferred type of steering mechanism may be employed for the wheels if a separate steering means is a desideratum, but may be dispensed with when the steering is being accomplished by varying the speed of the endless tracks, in which case the trailing wheels 107 will accommodate themselves to the lateral movements of the rear end of the machine in the usual caster-wheel fashion.

Upon the main frame C is located a power plant comprising an internal combustion motor M with its usual appurtenances, such as gasolene and water tanks O and P respectively. Shaft Q of said motor is connected with a transmission and differential mechanism R and R' which may be of any preferred type of construction. Said transmission is located in alinement with the longitudinal center of the frame C, near the front connecting beam $6^b$ thereof, upon a transverse transmission shaft 108, which shaft is mounted in suitable journal bearings 109 and $109^a$ fastened to the side sills 6 and $6^a$ respectively.

Located under sills 6 and $6^a$, near the point of the longitudinal center of loading of frame C, are journal boxes 5 and $5^a$ for the reception of a transverse shaft 3, which shaft is firmly held from rotation in said boxes by suitable pins passing through the same or otherwise. This shaft projects an equal distance beyond side sills 6 and 6ª and these ends are fitted into suitable openings in traction trucks B; collars 8 and pins 9 on the ends of said shaft being employed to prevent the withdrawal of said trucks from said shaft ends. These trucks support the frame structure C and its load at about its longitudinal center of loading, the balance being slightly in favor of the rear end, where a certain proportion of the weight is borne by the trailer wheels 107 and 107ª, the proportion of such weight being only enough to prevent the frame C from tilting about the axis of the shaft 3.

Traction trucks B are provided with power receiving sprockets 19, which sprockets are in alinement with sprockets 110 and 110ª located on shaft 108, exteriorly of the sills 6 and 6ª of the frame C, as clearly seen in Fig. 8. Trained over sprockets 110 and 110ª and their respective power receiving sprockets 19 are link belts 111 and 111ª, whereby power may be transmitted to said sprockets 19, their shafts 17, pinions 16, endless track drive sprockets 13, idler wheels 29, and endless track chains A, all as best seen in Fig. 1.

Centrally of and embracing shaft 3, in alinement with the longitudinal center line of frame C, is a U-shaped forging 112, between the open jaws of which is retained, by a pin 113, a rearwardly and downwardly extending drawbar 114, the free end of which is formed into a fork 115 having a pin 115ª, to which may be attached a suitable cable when the outfit is employed for haulage. Near the outer end of this drawbar is provided a support therefor composed of angles 116 and 116ª depending from sills 6 and 6ª and a horizontal, transverse angle 116ᵇ, which connects angles 116 and 116ª. It will now be observed that the drawbar 114 being swiveled in U-shaped forging 112, the same may slide along angle 116ᵇ and a direct line pull will always be had from the said bar, even when the engine is turning a corner. It is also to be recalled that the drawbar being attached at a point in about the center of loading, no undue stresses are set up in the frame C under excessive tractive effort.

Embracing shaft 3 on either side of U-shaped forging 112 are heavy diagonal braces 117 and 117ª, held in place by collars 175 and 175ª, the free ends of which extend downwardly and outwardly to and embrace the inner ends of shafts 11ª (located in the rear end of traction trucks B) adjacent hubs 11. These braces are rigidly maintained in position on these shafts and the object thereof is to maintain trucks B in relative parallelism and yet permit a certain flexibility thereof while turning corners. Attention is also directed to the fact that the said trucks being oscillatably mounted under frame C, the same may independently mount over obstructions in the path of travel without creating an undue strain throughout the entire frame. Again by a reference to Fig. 1, it will be seen that a line drawn from the center of shaft 108 to the center of shaft 17 will also pass through the center of shaft 3, which is the axis of oscillation for the trucks B. This being the case, and the fact that shaft 17 is as close as possible to shaft 3, it will be obvious that, no matter how great the oscillation of the trucks B within practical limits, the variations of the center distances between shafts 108 and 17 will be almost imperceptible, so that there will be no tightening or loosening of chains 111 and 111ª under any conditions of service. Tightening of chains means great friction and loss of power; loosening thereof means a flop of the chains with the danger of jumping from their sprockets and consequent breakage of adjacent parts. By eliminating these serious faults, as I have, I produce an outfit of higher efficiency and greater lasting qualities than any with which I am acquainted.

To reduce the skidding and drag of the inner endless track chain when turning sharp corners, as most frequently encountered on farm work, such as plowing, harvesting and the like, I provide certain means by which either one or the other end of both of the traction trucks may be bodily and simultaneously lifted from the ground as clearly seen in Fig. 2, whereby the turning movement of the vehicle is confined to only a very small portion of the length of the endless track chains, normally in contact with the ground, and the skidding and drag thereof practically eliminated. This means consists essentially of a transverse shaft 119 oscillatable in journal brackets 120 located on the underside of sills 6 and 6ª. Adjacent sill 6 and exteriorly thereof, this shaft is provided with a securely fastened crank arm 121, from which depends a vertically slotted link 122, the slot 123 of which embraces the inner end of shaft 11ª, as indicated in Fig. 2. Above and below said shaft the said link is drilled for two pins 124ª and 125ª, which when driven home closely contact with the periphery of the shaft. These pins 124ª and 125ª, when removed from the links permit shafts 11ª to freely move in said slots 123 so that the trucks are liberated and free to move vertically at their rear ends to follow undulations of the ground or to pass over obstructions thereon without interfering with the mechanism for lifting and depressing the rear ends of said trucks. When, however, in this condition it is desired to effect a turn in the road, the long hand-lever 124 is raised to its highest position which causes the upper end of the slots in said links to bear upon, and depress, the shafts 11ª, thereby raising the forward part of the trucks from the ground and causing the turning of the machine to take effect on the rear portion of the endless tracks. It will thus be readily understood that by this construction either the forward, or the rearward, portion of the tracks can be elevated at pleasure so that the weight of the machine may be thrown upon the forward or the rear ends of the trucks, whichever may be the most advantageous position, under existing conditions of the road, closeness of quarters within which the machine must be turned, and for other obvious reasons. Link 122 is maintained on shaft 11ª by means of a washer 118 and a pin 118ª or equivalent means. Adjacent and exteriorly of sill 6ª, shaft 119 is provided with a similar crank arm 121 and slotted link with its cross pins, the whole connecting in a like manner with the shaft 11ª of the truck B on that side of the outfit. Said shaft 119 is also possessed of a long hand lever 124 extending rearwardly to a point in close proximity to a seat 125 located at the extreme rear end of the machine, on an operating platform 126. Said lever is possessed of a latch mechanism 127 adapted to engage notches 128 in a quadrant 129, whereby the hand lever 124 may be locked in anyone of several predetermined positions. The operation of this device may now be described as follows: When the endless track chains A are in road contact for their entire length, the position of hand lever 124 will be as seen in Fig. 1. But when the machine approaches a corner to be turned, the operator occupying the seat 125 first depresses lever 124 to the position shown in Fig. 2, when the rear end of the trucks B will be elevated from the ground as readily comprehended, after which the steering mechanism is actuated in obvious manner. When it is required to make a turn while backing up, the lever 124 is raised to its highest position with its latch mechanism engaging the uppermost of the notches 128 of the quadrant 129, when it will be found that the forward ends of the trucks will be elevated free of the road surface. The steering is then accomplished as before.

In many cases the outfit will be employed for haulage purposes over practically straight roads many, many miles in length, wherein it will not be necessary to elevate the truck ends. In this event it is simply necessary to knock out the pins 124ª and 125ª in the slotted links 122.

To one end of shaft 108 exteriorly of sprocket 110ª is fastened a pulley 130 for the reception of a suitable belt, whereby the tractor may be employed for threshing and like purposes. For this reason sprockets 110 and 110ª are loosely mounted on shaft 108 and are adapted to be engaged by suitable friction clutches 131 and 131ª. When these clutches are thrown out, it is evident that sprockets 110 and 110ª will cease to revolve and the machine as a whole will remain stationary, while shaft 108 and pulley 130 will continue to rotate as long as the motor M is in operation. Reversal of rotation of shaft 108 is accomplished by sliding sleeve 140, which will actuate the reverse mechanism within transmission R, which may be of any preferred type.

While herein I have described the preferred construction of my traction engine, I desire it understood that I may make such changes therein as would suggest themselves to the skilled mechanic and permitted under the doctrine of mechanical equivalents without falling outside the spirit or scope of my invention.

Having thus fully described my invention, I claim as new and desire to secure to myself by Letters Patent of the United States:—

1. In a traction engine a main frame having a power plant and transmission means thereon, a traction truck oscillatably mounted at each side of said frame, the point of oscillation of said trucks being slightly in front of the center of said trucks, the slight preponderance of weight of said trucks being in the rear thereof, an endless traction belt in each of said trucks, means connected with said endless traction belts constructed to vary the speed of movement of each belt independently of, and conjointly with the other of said belts, and means located on said frame to simultaneously elevate one of the free ends of both of said trucks, said latter means including a single, long, rearwardly-extending arm, a shaft to which said arm is affixed at its forward end, a crank-arm at each end of said shaft, and links connecting said crank arms to the traction trucks at the rear ends thereof, whereby when said trucks are raised at their rear ends, the machine is constructed to turn at the forward ends of said trucks.

2. In a traction engine a main frame having a power plant and transmission means thereon, a traction truck flexibly mounted at each side of said frame, manually operated means located on said frame to simultaneously elevate one of the free ends of both of said trucks, said means comprising a transverse shaft mounted under said main frame and having at each end a crank arm fixed thereto, a link depending from each of said crank arms connecting with one end of each of said trucks, said links being slotted, there being in said links means constructed to positively engage one of the free ends of said trucks to prevent vertical movement of said trucks, said means being removable to liberate said free ends, a long operating lever with latch devices, and a quadrant on said frame having means engaging said latch devices.

3. In a traction engine, a main frame having a power plant and transmission means thereon and a transverse dead axle under the same extending beyond the sides of said frame, traction trucks oscillatably mounted on the opposite ends of said axle, manually operated means located on said frame to simultaneously elevate one of the free ends of both of said trucks, said means comprising a transverse shaft mounted under said main frame and having at each end a crank arm fixed thereto, a slotted link depending from each of said crank arms connecting with one end of each of said trucks, a long operating lever with latch devices, a quadrant on said frame having means engaging said latch devices, and means for releasing said slotted links from positive engagement with said truck ends.

In testimony whereof I have hereunto set my hand in the presence of two subscribing witnesses.

ORLEY C. HOUGHTON.

In the presence of—
W. Harding,
William O. Stark.